United States Patent [19]
Godec et al.

[11] Patent Number: 5,499,452
[45] Date of Patent: Mar. 19, 1996

[54] METHOD OF MAKING RETAINERS FOR BALL BEARINGS

[75] Inventors: Maksimilijan Godec, Torrington, Conn.; James L. Lawson, Spartanburg, S.C.

[73] Assignee: The Torrington Company, Torrington, Conn.

[21] Appl. No.: 346,984

[22] Filed: Nov. 30, 1994

Related U.S. Application Data

[63] Continuation of Ser. No. 963,146, Oct. 12, 1992, abandoned, which is a continuation-in-part of Ser. No. 717,474, Jun. 19, 1991, abandoned.

[51] Int. Cl.$^6$ ............................ F16C 33/00; F16C 33/42
[52] U.S. Cl. .................... 29/898.067; 29/439; 29/441.1; 384/523; 384/531
[58] Field of Search ................ 29/898.061, 898.064, 29/898.065, 898.067, 434, 438, 439, 441.1; 384/523, 525, 531, 532, 537

[56] References Cited

U.S. PATENT DOCUMENTS

| | | |
|---|---|---|
| 918,785 | 4/1909 | Sonnberg ...................... 29/898.061 |
| 1,197,466 | 9/1916 | Englerth et al. . |
| 1,496,516 | 6/1924 | Betz . |
| 1,537,590 | 5/1925 | Dlesk, Jr. ........................ 29/898.064 |
| 1,543,320 | 6/1925 | Cofrancesco et al. . |
| 1,598,025 | 8/1926 | Stevens .......................... 29/898.067 |
| 1,762,891 | 6/1930 | Rouanet . |
| 2,146,440 | 2/1939 | Pew .................................. 29/148.4 |
| 2,458,762 | 1/1949 | Barnbrook ......................... 113/117 |
| 3,918,777 | 11/1976 | Kitchin ........................... 29/898.067 |
| 4,322,878 | 4/1982 | Warchol ......................... 29/898.067 |
| 5,044,783 | 9/1991 | Willner .............................. 384/523 |
| 5,152,062 | 10/1992 | Alling et al. ................... 29/898.067 |
| 5,291,655 | 3/1994 | Benson et al. ............... 29/898.067 X |

Primary Examiner—S. Thomas Hughes
Attorney, Agent, or Firm—John C. Bigler

[57] ABSTRACT

Material is first formed into a flat ring. Ball retaining pockets are then formed in the flat ring leaving bridge material between adjacent pockets. Bearing balls are inserted into the ball retaining pockets and bridge material between adjacent pockets is then reshaped such that the bridge material wraps partially around the balls, thereby retaining the balls and forming a rigid bridge between adjacent ball pockets. The bridge is proximate a line common to the centers of adjacent balls.

21 Claims, 3 Drawing Sheets

METHOD OF MAKING RETAINERS FOR BALL BEARINGS

This application is a continuation of application Ser. No. 07/963,146, filed on Oct. 12, 1992, now abandoned, which is a continuation-in-part of application Ser. No. 07/717,474, filed on Jun. 19, 1991, now abandoned.

BACKGROUND OF THE INVENTION

This invention relates generally to a method of making ball bearing retainers and more particularly to a method of making one-piece ball bearing retainers.

Many types of prior art ball bearing retainers and cages have been used. One of the major types includes welded metal retainers where two halves are welded together. These welded two-piece retainers have fair wrap-around and conformity to the ball shape. Operating temperature is limited by the lubricant and not by the retainer. However, it is difficult to ensure 100 percent good welds with a welded two-piece retainer design.

Riveted two-piece metal retainers are similar to welded two-piece metal retainers except the two halves are riveted together rather than welded. This type retainer requires many small rivets that are difficult to insert. Visual inspection is more accurate than with welded retainers; however, poor riveting may occur. Similar, mechanically interlocked retainers also require two halves and may be difficult to fasten together.

Spring finger-type retainers offer a one-piece design but are difficult to make with sufficient ball contacting surface or wrap-around. Spring finger-type retainers usually require special heat treating. Polymer retainers offer one-piece design and have good wrap-around and ball conformity. However, polymer retainers are limited to lower temperature applications.

One proposed metal retainer is formed as one-piece and is formed by fashioning a sheet metal ring into an undulatory form with open loops or ball pockets spaced apart by U-shaped connecting portions. After the balls are placed into the pockets, the U-shaped connecting portions are upset causing the sides of the U-shaped connecting portions to spread and partially conform to the contour of the balls. However, a retainer of this proposed design would not have good resistance to ball collision forces during bearing operation and would not be rigid.

The foregoing illustrates limitations known to exist in present ball bearing retainers. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a method for making retainers or cages for ball bearings where material is first formed into a ring. Ball retaining pockets are then formed into the ring leaving bridge material between adjacent pockets. Bearing balls are inserted into the ball retaining pockets and bridge material between adjacent pockets is then reshaped such that the bridge material wraps partially around the balls, thereby retaining the balls and forming a rigid bridge between adjacent ball pockets. The bridge is proximate a line common to the centers of adjacent balls.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
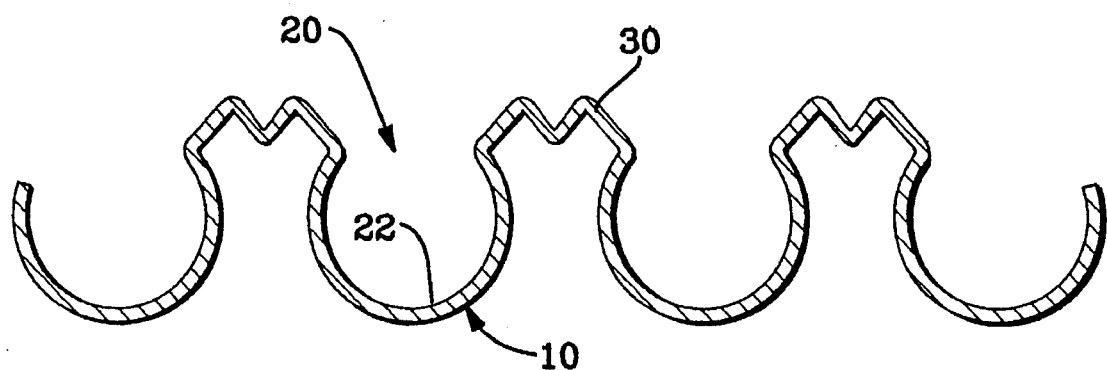
FIG. 1 is a cross-sectional view illustrating a partially formed embodiment of ball bearing one-piece retainer of the present invention.
Figure 2:
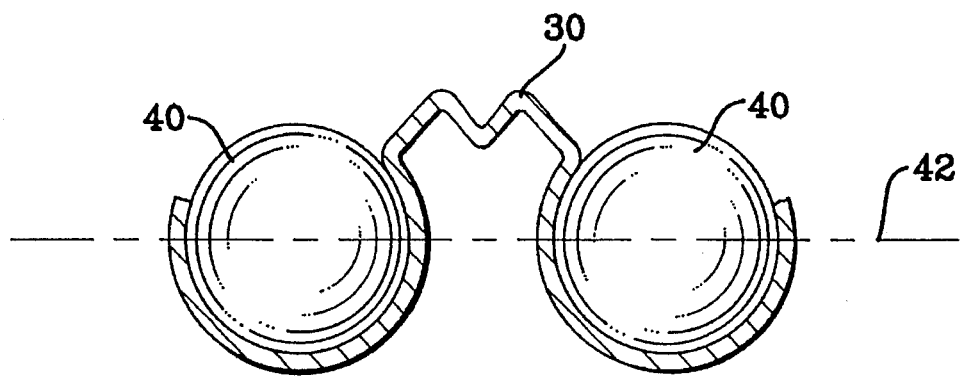
FIGS. 2 through 5 are cross-sectional views illustrating progressive steps in the forming of the one-piece retainer embodiment of FIG. 1.
Figure 3:
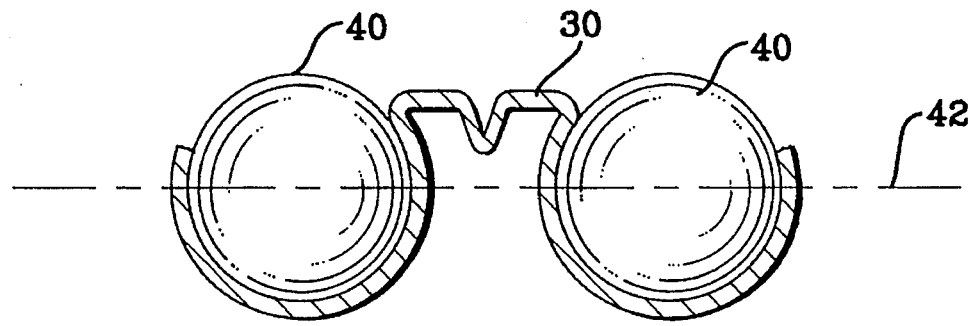
Figure 4:
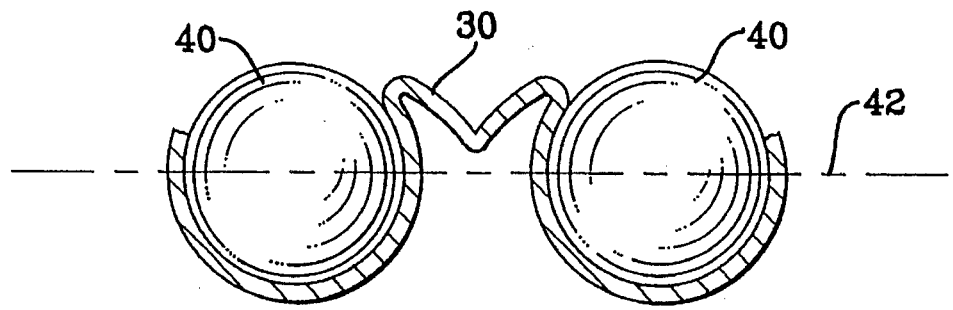

Referring now to the drawings, FIG. 1 illustrates a portion of a partially formed ball bearing one-piece retainer 10 of the present invention. One-piece retainer 10 is used to retain balls of an antifriction bearing as described below.

To form one-piece retainer 10, metal is first formed into the shape of a flat ring, using any known forming method. In one such method, the ring is punched as a "washer" from a wide strip or sheet of flat metal. In another method, the flat ring is formed from a narrow flat strip of metal which is bent edge-wise into the ring shape. The ends of the flat strip are then welded or left free and may overlap as described in co-pending application Ser. No. 717,486, filed Jun. 19, 1991 (U.S. Pat. No. 5,152,062).

Next, multiple ball receiving pockets 20 are pressed into the flat ring. Spherically concave ball seats 22 are also pressed into the flat ring, either concurrently with the forming of ball receiving pockets 20 or as a separate, subsequent step. When ball receiving pockets 20 are formed, bridge material 30 is left between adjacent ball receiving pockets 20. In the preferred embodiment illustrated, bridge material 30 is folded into an initial "M" shape, as shown in FIG. 1. This "M" shape facilitates the final forming steps, described below. However, other initial shapes of bridge material 30, such as for example an inverted "U" shape, can be used with similar effect in the practice of the present invention.

Figure 5:
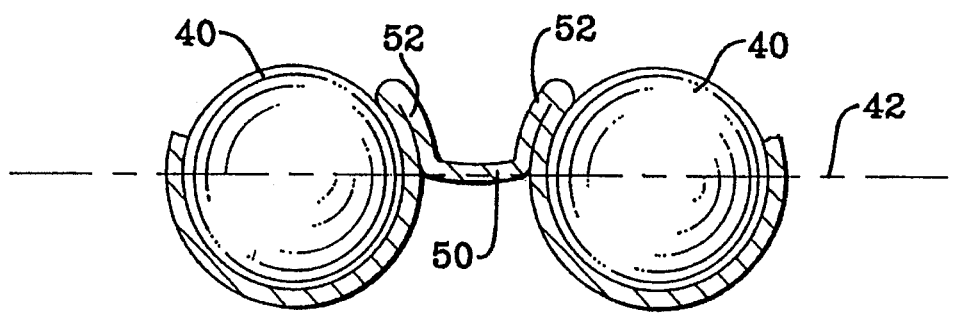

FIGS. 2 through 5 illustrate progressive steps of reshaping bridge material 30. Bridge material 30 is pressed progressively to form a rigid bridge 50 between adjacent ball receiving pockets 20 and to form a pair of ball retaining fingers 52 partially enveloping bearing balls 40, as illustrated in FIG. 5. The initial depth of ball receiving pockets 20 is greater than one-half the diameter of bearing balls 40 to provide adequate length of retaining fingers 52 and to provide sufficient retention of bearing balls 40. Dimensions of bridge material 30 are selected to result in good wrap-around and ball conformity.

Bridge 50 is located on or proximate the centerline 42 of bearing balls 40, as illustrated in FIG. 5, to provide resistance to ball collision forces during bearing operation and to stiffen the resulting bearing retainer. Due to its location and relatively flat shape, bridge 50 performs almost like solid material between adjacent bearing balls 40. In contrast, prior art methods of forming one-piece retainers from strip or sheet metal do not result in a bridge between ball receiving pockets that is sufficiently rigid and resistant to ball collision forces.

Figure 6:
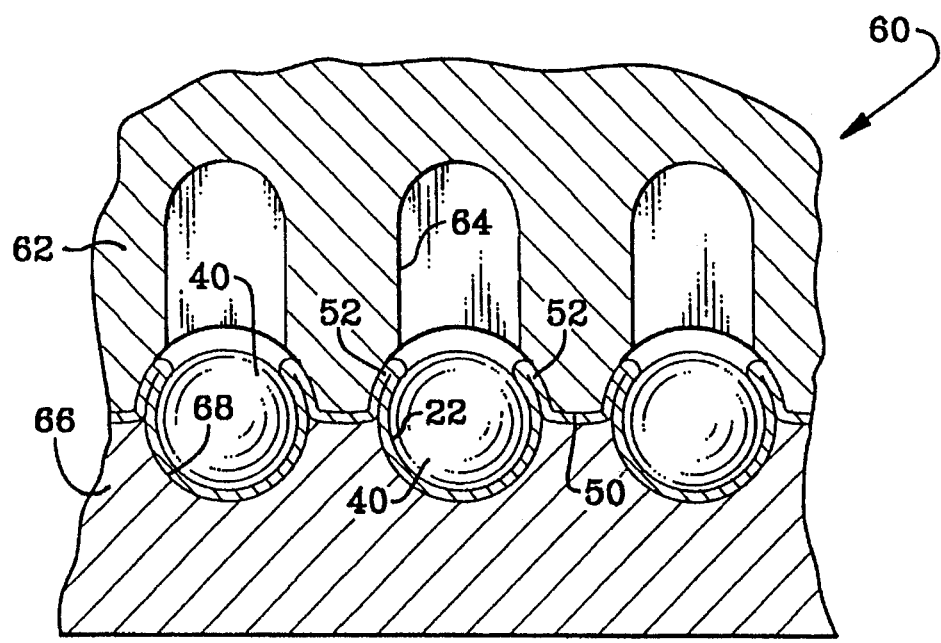
FIG. 6 is a cross-sectional front view illustrating tooling that may be used for forming the one-piece retainer embodiment of FIGS. 1 through 5.
Figure 7:
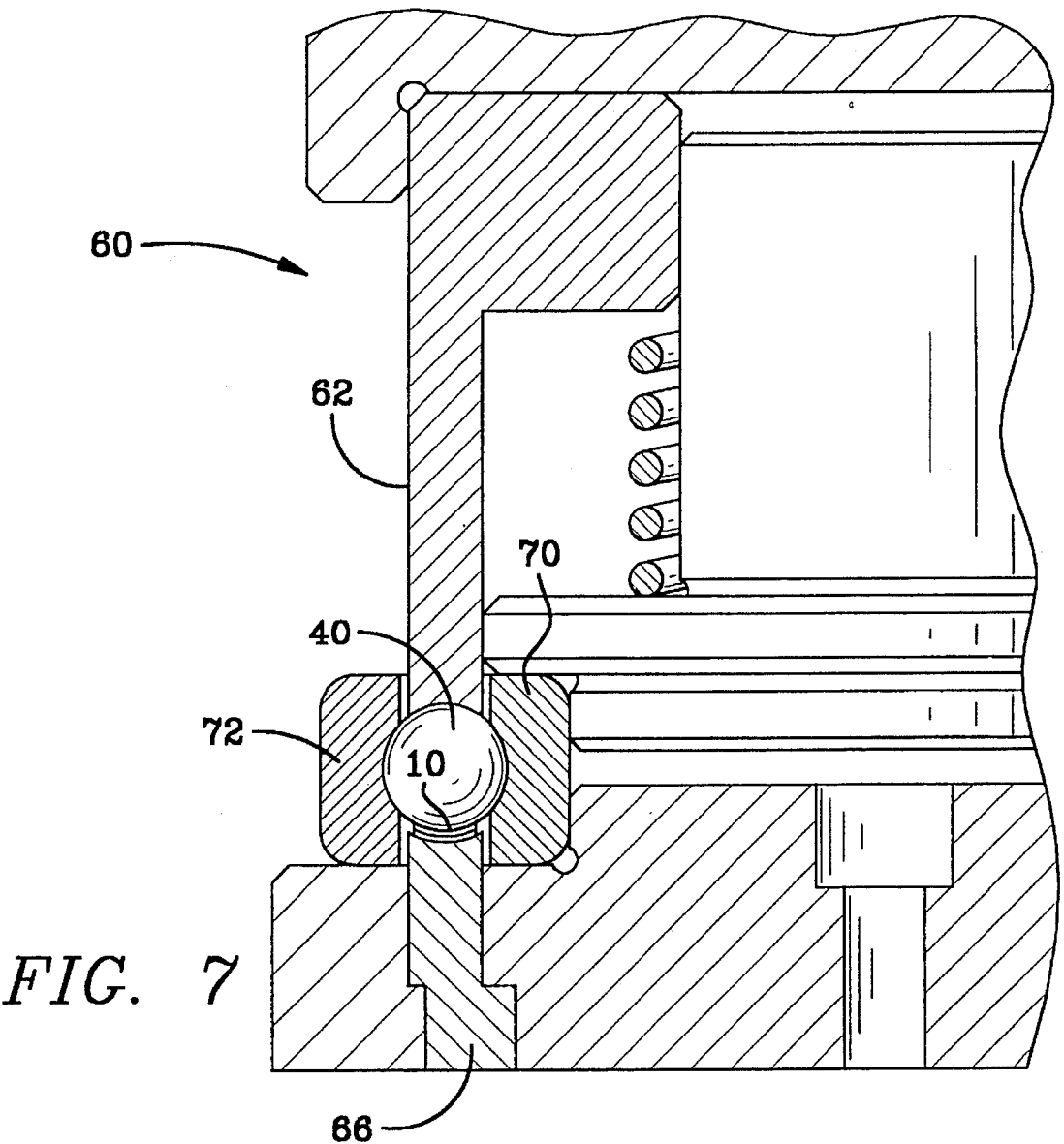
FIG. 7 is a cross-sectional side view illustrating the tooling of FIG. 6.

FIGS. 6 and 7 are cross-sectional front and side views illustrating forming press 60 which may be used to press bridge material 30 so as to form bridge 50 and retaining fingers 52. Upper portion 62 of a die set includes fingers 64 which mate with lower portion 66 of the die set to flatten bridge material 30 between ball receiving pockets 20 and to fold bridge material 30 back on itself. Lower portion 66 includes spherically concave recesses 68 for receiving ball seats 22 and bearing balls 40.

As illustrated in FIG. 7, final forming of the ball bearing retainer is done after one-piece retainer 10 is positioned between inner and outer bearing races 70 and 72, respectively, and after insertion of bearing balls 40 into bearing pockets 20. However, it is not necessary to position one-piece retainer 10 between bearing races when producing the final form of the ball bearing retainer. It is also convenient to use the present invention to produce a subassembly with only the bearing retainer and bearing balls. Such as bearing retainer, which retains the bearing balls in all directions without aid of bearing races, is referred to herein as a bearing "cage".

The present invention allows visual inspection of a bearing assembly or bearing cage to determine if bearing balls 40 are properly secured. Ball retaining fingers 52 are easily visible, even when installed between inner and outer bearing races 70 and 72. The assembled bearing has annular openings between the bearing races after the bearing assembly is removed from forming press 60, as is apparent from FIG. 7. In contrast, welds and rivets of prior art bearing retainers are not easily inspected for proper fastening.

Ball seats 22 of partially formed one-piece retainer 10 illustrated in FIG. 1 have a "snap" fit that helps keep bearing balls 40 in ball receiving pockets 20 during handling of the loaded bearing retainer, or bearing cage, before final forming of the bearing retainer. This retention feature facilitates pre-load grinding and measurement. Also, this feature aids insertion of partially formed one-piece retainer 10 and bearing balls 40 into forming press 60 to reshape bridge material 30 of a bearing retainer or bearing cage.

The final shape of the ball bearing retainer illustrated in FIGS. 5 and 6 is such that retaining fingers 52 and ball seats 22 are somewhat spring loaded, providing a holding force that continues to hold bearing balls 40 tightly, even as the bearing retainer or bearing cage is subjected to vibration and shock loading. The over-center design of the present invention tightens instead of loosening with vibration and deflections, unlike riveted and welded retainers.

Figure 8:
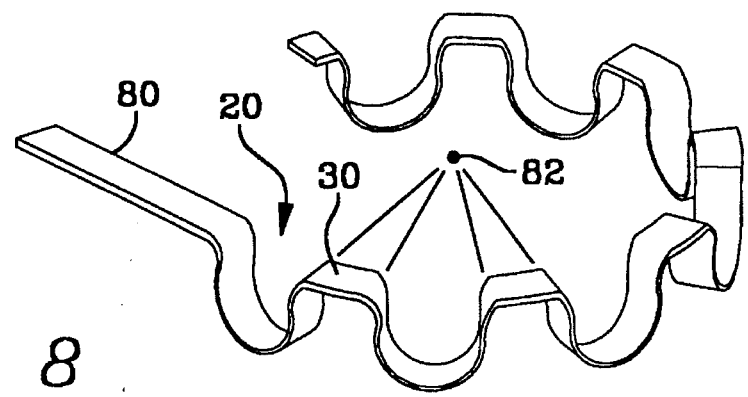
FIG. 8 is a pictorial view illustrating one method of partially forming the embodiment of one-piece retainer of FIGS. 1 through 5 from a flat strip of metal.

FIG. 8 illustrates one method of making partially formed one-piece retainer 10 of FIG. 1. In this method, narrow flat metal strip 80 is bent edge-wise about center 82 and is formed into ball receiving pockets 20 with spherically concave ball seats 22. Bridge material 30 has not yet been formed into the "M" shape of one-piece retainer 10, and flat metal strip 80 has not been cut to form a second end. As stated above, it may not necessary to join the ends of one-piece retainer 10, and the ends may be allowed to overlap. This method results in material savings and reduces inventory requirements since only a few sizes of flat strip or wire stock must be maintained.

From the above, it will be apparent that the present invention provides a method of making a ball bearing retainer that has good wrap-around and ball conformity in combination with high temperature limits. Because the resulting ball bearing retainer is a one-piece design, assembly problems relating to assembling two halves together are avoided. Also, the present invention provides a method of making a bearing cage with similar features suitable for use as a subassembly for insertion in ball bearing assemblies.

Having described the invention, what is claimed is:

1. A method of producing a one-piece ball bearing retainer or bearing cage comprising the steps of:

forming material into a flat ring;

pressing the flat ring, thereby forming ball receiving pockets and bridge material between adjacent ball receiving pockets;

inserting a bearing ball into each ball receiving pocket, each of the bearing balls having a spherical surface equi-distant from a center point; and reshaping the bridge material between adjacent ball receiving pockets such that the bridge material wraps partially around the bearing balls, thereby retaining the bearing balls, and forms a rigid bridge between adjacent ball pockets, the rigid bridge coinciding with a plane intersecting the center point of each of the bearing balls.

2. The method of claim 1, wherein the steps of forming material into a ring and forming ball receiving pockets are performed concurrently.

3. The method of claim 1, further comprising the step of pressing the ball receiving pockets, thereby forming spherically concave ball seats.

4. The method of claim 1, further comprising the step of positioning the ring, with the ball receiving pockets formed therein, between inner and outer bearing races before the step of reshaping the bridge material to form a bridge between adjacent pockets.

5. The method of claim 1, wherein each of the ball receiving pockets has a depth greater than one-half the diameter of a bearing ball to be received in the ball receiving pocket.

6. The method of claim 1, wherein the bridge material between adjacent pockets initially has an "M" shape.

7. The method according to claim 1, wherein the step of pressing the ring forms the ball receiving pockets with side walls of the ball receiving pockets converging such that retention of a bearing ball in the ball receiving pockets is enhanced.

8. A method of producing a ball bearing retainer or bearing cage comprising the steps of:

forming material into a ring having ball receiving pockets and bridge material between adjacent ball receiving pockets;

inserting a bearing ball into each ball receiving pocket; and reshaping the bridge material between adjacent ball receiving pockets such that the bridge material is folded back on itself, thereby forming a pair of ball retaining fingers wrapping partially around the balls, and forms a bridge between adjacent ball receiving pockets, the bridge being proximate a line common to the center of adjacent balls.

9. The method according to claim 8, further comprising forming the ring and the ball receiving pockets concurrently.

10. The method of claim 8, further comprising the step of pressing the ball receiving pockets, thereby forming spherical ball seats.

11. The method of claim 8, further comprising the step of positioning the ring, with the ball receiving pockets formed therein, between inner and outer bearing races before the step of reshaping the bridge material to form a bridge between adjacent ball receiving pockets.

12. The method of claim 8, wherein each of the ball receiving pockets has a depth greater than one-half the diameter of a bearing ball to be received in the ball receiving pocket.

13. The method of claim 8, wherein the bridge material between adjacent ball receiving pockets initially has an "M" shape.

14. The method according to claim 8, wherein the step of forming the ring forms side walls of the ball receiving pockets converging such that retention of a bearing ball in the ball receiving pockets is enhanced.

15. The method according to claim 8, wherein the step of forming the ring having ball receiving pockets and bridge material between adjacent ball receiving pockets comprises steps of providing a flat ring and pressing the flat ring, thereby forming the ball receiving pockets.

16. A method of producing a ball bearing retainer or bearing cage comprising the steps of:

forming material into a ring
   having ball receiving pockets and bridge material between adjacent ball receiving pockets, each of the ball receiving pockets having a depth greater than one-half the diameter of a bearing ball to be received in the ball receiving pocket;
   positioning a plurality of bearing balls and the ring between inner and outer bearing races, one of the bearing balls being located in each ball receiving pocket; and
   reshaping the bridge material between adjacent ball receiving pockets such that the bridge material is folded back on itself, thereby forming a pair of ball retaining fingers wrapping partially around the balls, and forms a bridge between adjacent ball receiving pockets, the bridge being proximate a line common to the center of adjacent balls.

17. The method of claim 16, further comprising forming the ring and the ball receiving pockets concurrently.

18. The method of claim 16, further comprising the step of pressing the ball receiving pockets forming spherical ball seats.

19. The method of claim 16, wherein the bridge material between adjacent pockets initially has an "M" shape.

20. The method according to claim 16, wherein the step of forming the ring forms side walls of the ball receiving pockets converging such that retention of a bearing ball in the ball receiving pockets is enchanced.

21. The method according to claim 16, wherein the step of forming the ring having ball receiving pockets and bridge material between adjacent ball receiving pockets comprises steps of providing a flat ring and pressing the flat ring, thereby forming the ball receiving pockets.

\* \* \* \* \*